United States Patent
Adams (10) Patent No.: US 9,538,169 B2
(45) Date of Patent: Jan. 3, 2017

(54) QUALITY TEST DEVICE FOR INSPECTING VEHICULAR DISPLAY MODULE HAVING THIN-FILM TRANSISTORS

(71) Applicant: DENSO International America, Inc., Southfield, MI (US)

(72) Inventor: Christopher Adams, Maryville, TN (US)

(73) Assignee: Denso International America, Inc., Southfield, MI (US)

( * ) Notice: Subject to any disclaimer, the term of this patent is extended or adjusted under 35 U.S.C. 154(b) by 242 days.

(21) Appl. No.: 14/531,042

(22) Filed: Nov. 3, 2014

(65) Prior Publication Data
US 2016/0125582 A1    May 5, 2016

(51) Int. Cl.
| | |
|---|---|
| *G06T 7/00* | (2006.01) |
| *H04N 17/00* | (2006.01) |
| *G09G 3/00* | (2006.01) |
| *G09G 3/36* | (2006.01) |

(52) U.S. Cl.
CPC ............. *H04N 17/00* (2013.01); *G06T 7/0002* (2013.01); *G09G 3/006* (2013.01); *G09G 3/3648* (2013.01); *G09G 2360/145* (2013.01)

(58) Field of Classification Search
None
See application file for complete search history.

(56) References Cited

U.S. PATENT DOCUMENTS

| | | | | |
|---|---|---|---|---|
| 6,348,690 | B1 * | 2/2002 | Iwabuchi | G01N 23/20 250/307 |
| 7,116,816 | B2 * | 10/2006 | Tanaka | G06T 7/001 250/305 |
| 2001/0033683 | A1 * | 10/2001 | Tanaka | G06T 7/001 382/149 |
| 2012/0281033 | A1 | 11/2012 | Yoshida et al. | |

* cited by examiner

*Primary Examiner* — Bernard Krasnic
(74) *Attorney, Agent, or Firm* — Harness, Dickey & Pierce, P.L.C.

(57) ABSTRACT

A quality test device tests a display device having a plurality of thin film transistors (TFTs). The quality test device includes a color analyzer for determining a color of an image displayed by the display device, and a quality inspection module. The quality inspection module controls a display state of the display device and determines whether the TFTs are adequately disposed within the display device based on a performance threshold. The quality inspection module determines that the display device is defective when a performance data of the display device is outside of the performance threshold, and determines that the display device is normal when the performance data is within the performance threshold.

15 Claims, 8 Drawing Sheets

FIG - 4

| TFT | Toggle Pattern | |
|---|---|---|
| | First | Second |
| TFT$_{B0}$ | 0 | 1 |
| TFT$_{B1}$ | 1 | 0 |
| TFT$_{B2}$ | 0 | 1 |
| TFT$_{B3}$ | 1 | 0 |
| TFT$_{B4}$ | 0 | 1 |
| TFT$_{B5}$ | 1 | 0 |
| TFT$_{G0}$ | 0 | 1 |
| TFT$_{G1}$ | 1 | 0 |
| TFT$_{G2}$ | 0 | 1 |
| TFT$_{G3}$ | 1 | 0 |
| TFT$_{G4}$ | 0 | 1 |
| TFT$_{G5}$ | 1 | 0 |
| TFT$_{R0}$ | 0 | 1 |
| TFT$_{R1}$ | 1 | 0 |
| TFT$_{R2}$ | 0 | 1 |
| TFT$_{R3}$ | 1 | 0 |
| TFT$_{R4}$ | 0 | 1 |
| TFT$_{R5}$ | 1 | 0 |

46A → TFT$_{B1}$ row group (TFT$_{B0}$–TFT$_{B5}$)
46B → TFT$_{G2}$ row group (TFT$_{G0}$–TFT$_{G5}$)
46C → TFT$_{R2}$ row group (TFT$_{R0}$–TFT$_{R5}$)

54 — First column
58 — Second column

| | x | y |
|---|---|---|
| First Model Value | $x_{M1}$ | $y_{M1}$ |
| Second Model Value | $x_{M2}$ | $y_{M1}$ |

FIG - 10

| Model Parameters | $\Delta x_M$ | $\Delta y_M$ | $\Delta_M$ |
|---|---|---|---|
| | $|x_{M2} - x_{M1}|$ | $|y_{M2} - y_{M1}|$ | $\Delta y_M - \Delta x_M$ |
| Upper Tolerance | $UT_x$ | $UT_y$ | $UT_\Delta$ |
| Lower Tolerance | $LT_x$ | $LT_y$ | $LT_\Delta$ |
| Performance Threshold Upper Threshold; Lower Threshold | $\Delta x_M + UT$ ; $\Delta x_M - LT_x$ | $\Delta y_M + UT_y$ ; $\Delta y_M - LT_y$ | $\Delta_M + UT_\Delta$ ; $\Delta_M - LT_\Delta$ |

*FIG - 11*

| Test Parameters | | | | |
|---|---|---|---|---|
| P1 | P2 | P3 | P4 | P5 |
| $\Delta X$ | $\Delta Y$ | $\Delta$ | $m$ | $d$ |
| $|X_2 - X_1|$ | $|Y_2 - Y_1|$ | $\Delta Y - \Delta X$ | $\Delta y / \Delta x$ | $\sqrt{\Delta x^2 + \Delta y^2}$ |

QUALITY TEST DEVICE FOR INSPECTING VEHICULAR DISPLAY MODULE HAVING THIN-FILM TRANSISTORS

FIELD

The present disclosure relates to a display device disposed in a vehicle and that includes multiple thin-film transistors (TFTs).

BACKGROUND

This section provides background information related to the present disclosure which is not necessarily prior art. Vehicles, such as automobiles, buses, trucks, and trains, can be equipped with one or more display modules for conveying information to an occupant. Display devices include, for example, infotainment centers with liquid crystal displays (LCDs), head-up displays (HUD), and/or instrument panels.

A display device can include multiple thin-film transistors (TFTs) which are field-effect transistors that have thin films of an active semiconductor layer, a dielectric layer, and metallic contacts over a supporting non-conducting material, such as glass. As part of a pixel, a given TFT is connected to a printed circuit board (PCB) which may control the operation the pixel via the TFT. The display device may include equal number of red, blue, and green pixels.

The TFTs can control the intensity of the color emitted by the pixel. For example, a TFT that produces a low intensity color may be referred to as a least significant bit (LSB) and a TFT that produces a high intensity color may be referred to as a most significant bit (MSB). A MSB may affect the color of an image generated by the display device more than a LSB. Accordingly, when a LSB is not properly connected to the PCB (e.g., an open or short connection), the image displayed by the display device may not appear abnormal to a user. However, when a MSB is not properly connected, the image displayed by the display device may appear abnormal to the user. Therefore, it is difficult to determine whether all of the TFTs are connected to the PCB by simply looking at the image displayed by the display device.

SUMMARY

This section provides a general summary of the disclosure, and is not a comprehensive disclosure of its full scope or all of its features.

A quality test device of the present disclosure tests the quality of a display device which is configured to be disposed in a vehicle. The display device includes a plurality of thin film transistors (TFTs).

The quality test device includes a color analyzer and a quality inspection module. The color analyzer determines a color of an image displayed by the display device. For example, the color analyzer may measure a chromaticity of the image. The quality inspection module controls the display device to a predetermined display state, and determines whether the TFTs are adequately connected to a printed circuit board disposed within the display device based on a performance threshold.

The color analyzer determines the color of the image displayed by the display device when the display device is controlled to the predetermined display state. The quality inspection module calculates performance data based on the color detected by the color analyzer and a test parameter associated with the performance threshold. The quality inspection module determines that the display device is defective when the performance data is outside of the performance threshold, and determines that the display device is normal when the performance data is within the performance threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

A display device is typically tested for quality purposes before being installed in a vehicle. In one test operation, a technician may determine whether multiple thin-film transistors disposed in the display device are adequately connected to a printed circuit board (PCB). For example, the technician may view an image having cyan, magenta, and yellow color blocks and make a visual inspection to determine whether the display device is defective or acceptable. However, by relying on the visual inspection of the technician, the test operation may be subjective and prone to human error. A quality test device as described herein tests the connection between each of TFTs and the PCB in determining the quality of the display device.

Figures 1, 2, 3:
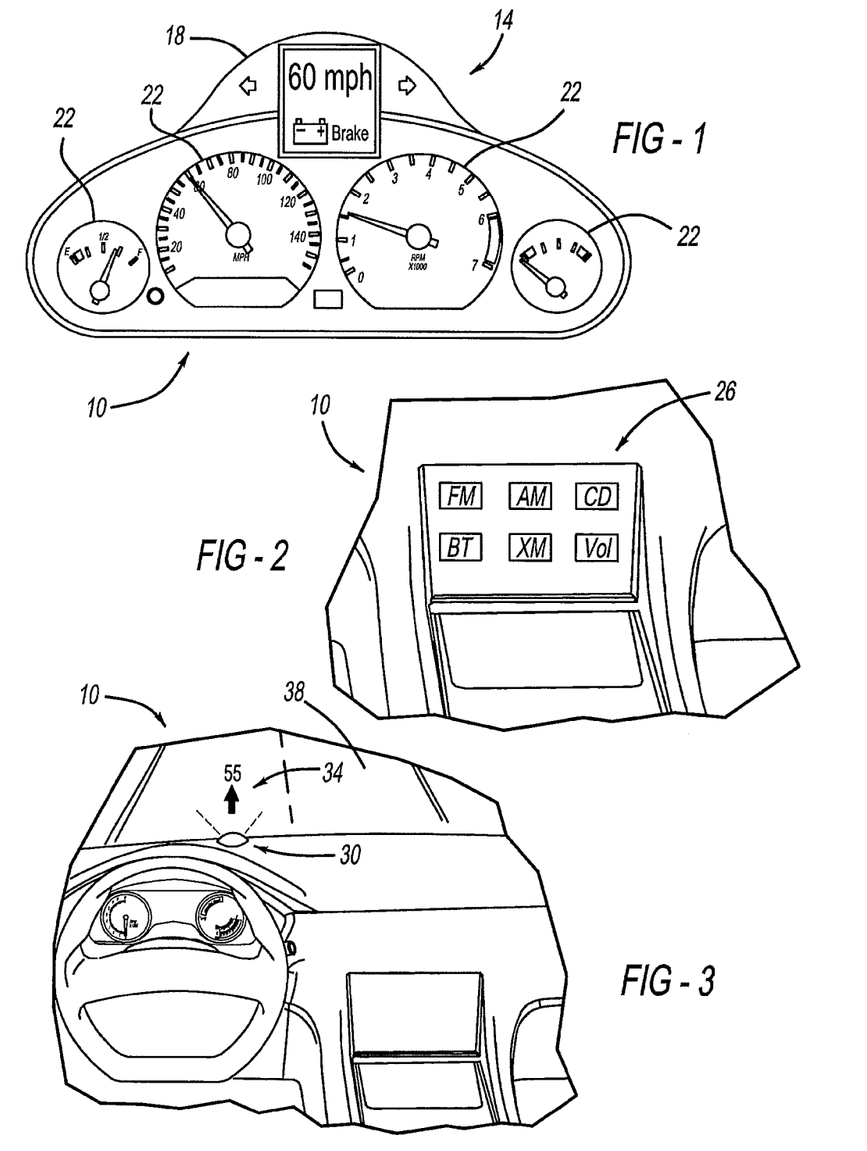
FIG. 1 illustrates an instrument panel as an example of a display device disposed in a vehicle.
FIG. 2 illustrates an infotainment center as an example of the display device disposed in the vehicle.
FIG. 3 illustrates a heads-up display (HUD) as an example of the display device disposed in the vehicle.

With reference to FIGS. 1-3, a vehicle may include one or more display devices 10 disposed in a passenger cabin for presenting information to a passenger. As an example, the display devices 10 include an instrument panel 14 that includes a digital gauge 18 and/or analog gauges 22. The gauges 18 and 22 display information related to, for example, a vehicle speed, a battery state, fuel quantity, and engine speed. The digital gauge 18 may be a liquid crystal display (LCD) that displays information in color. Portions of the analog gauge 22, such as the numbers, the indictors, and/or the dial may be illuminated via colored light.

As another example, the display devices 10 include an infotainment center 26 which may be an LCD with a touch screen display (FIG. 2). The infotainment center 26 may be disposed at the center console and displays menu buttons, such as audio selection, climate control, navigation, and other suitable operable systems available to the passenger. In yet another example, the display devices 10 include a heads-up display (HUD) 30 which project an image 34 onto a windshield 38 of the vehicle (FIG. 3). The image 34 projected by the HUD 30 may be information related to, for example, a travel direction, a vehicle speed, and lane markers.

Figure 4:
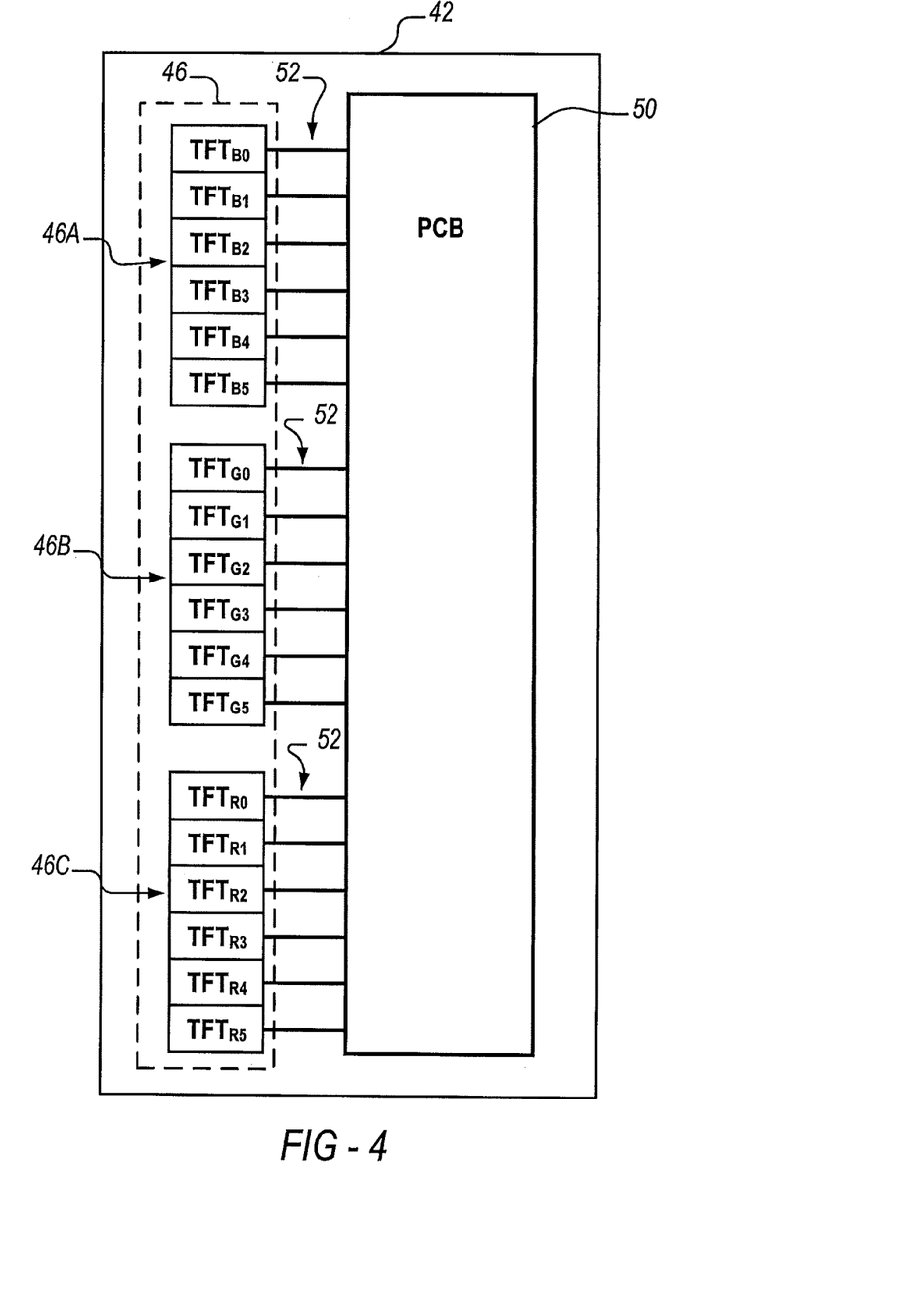
FIG. 4 illustrates a subject display device including multiple thin-film transistors (TFT) connected to a printed circuit board.

The display devices 10, such as the instrument panel 14, the infotainment center 26, and/or the HUD 30, may include multiple pixels each having thin-film transistors (TFT) for generating a colored image. For example, as shown in FIG. 4, a subject display device 42 which may be any one of the display devices 10, includes multiple TFTs 46 connected to a print circuit board (PCB) 50 via wires 52 (e.g., a flatwire). Each TFT 46 is part of a pixel (not shown) and is connected to a pin of the PCB 50. The PCB 50 controls the TFTs 46 for generating an image to be displayed by the subject display device 42. The PCB 50 turns respective TFTs 46 ON or OFF by sending a 1 or 0, respectively, to the TFTs 46.

In the example embodiment of FIG. 4, the subject display device 42 includes eighteen TFTs 46 which include six blue TFTs 46A ($TFT_{B0}$-$TFT_{B5}$), six green TFTs 46B ($TFT_{G0}$-$TFT_{G5}$), and six red TFTs 46C ($TFT_{R0}$-$TFT_{R5}$). While the subject display device 42 is described as having only eighteen TFT, it is readily understood that the subject display device may include any number of TFTs.

The TFTs 46 may produce varying intensities of a given color. For example, out of the pixels having the blue TFTs 46A, some of the pixels may produce a blue color that is less intense than other pixels based on respective blue TFTS 46A. A TFT that produces a low intensity color may be referred to as a least significant bit (LSB) and a TFT that produces a high intensity color may be referred to as a most significant bit (MSB). A MSB affects the color of the image generated by the subject display device 42 more than a LSB. Other TFTs may produce a color intensity in between the MSB and the LSB.

Each TFTs 46 is connected to respective pin of the PCB 50. If a given TFT from among the TFTs 46 is not adequately connected to the PCB 50, such as an open or shorted connection, the PCB 50 is not able to control the pixels via the TFTs 46. Accordingly, an inadequate connection between the PCB 50 and the TFTs 46, affects the color generated by the subject display device 42. During manufacturing, the display devices having the TFTs 46 may undergo a quality procedure to determine whether the TFTs 46 are connected to the PCB 50, so that the pixels having the TFTs generate the appropriate color.

Figure 5:
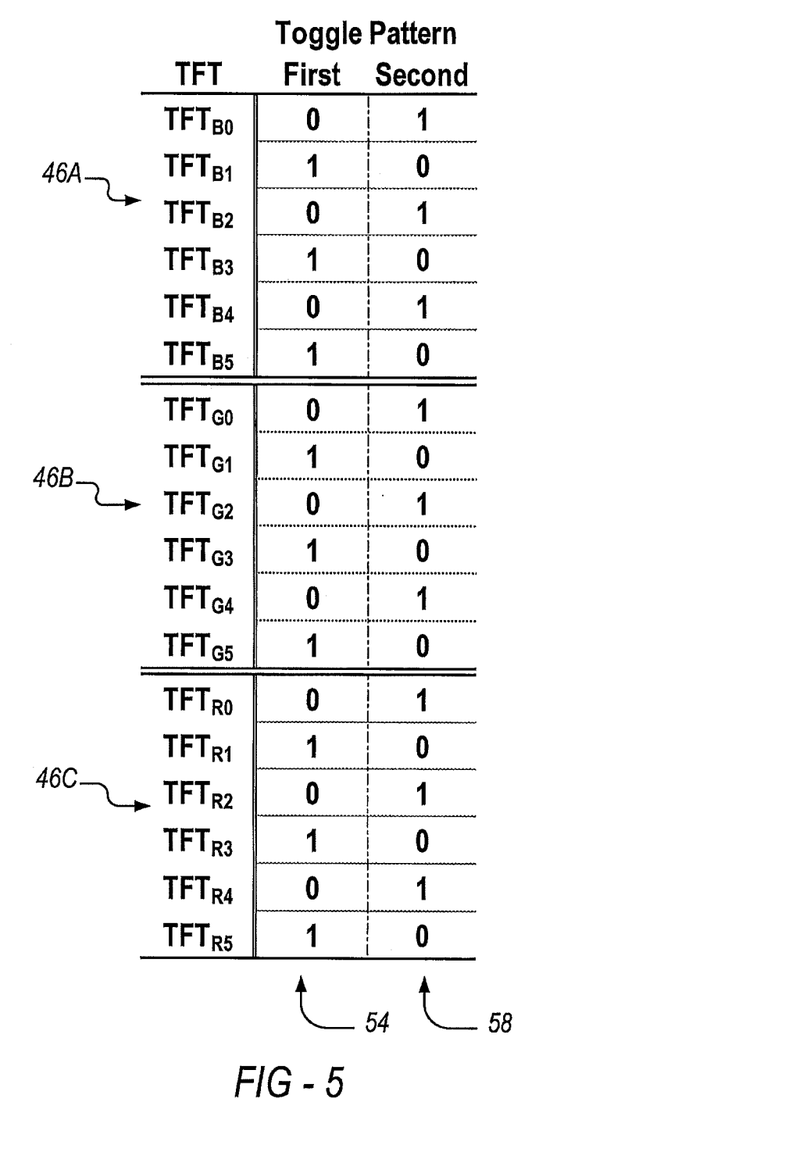
FIG. 5 illustrates a toggle pattern for controlling the TFTs of the subject display device.

For the quality procedure, each wired connection between the PCB 50 and the TFTs 46 is tested. The PCB 50 may toggle the TFTs in an ON-OFF pattern and then an OFF-ON pattern. For example, FIG. 5 shows a first toggle pattern 54 and a second toggle pattern 58 for operating the TFTs 46. The first toggle pattern 54 alternates between turning OFF (i.e., 0) and turning ON (i.e., 1) the TFTs 46. The second toggle pattern 58 alternates between turning ON (i.e., 1) and turning OFF (i.e., 0) the TFTs 46. Accordingly, each wired connection between PCB 50 and the TFTs 46 is tested.

In each toggle pattern an equal number of blue TFTs 46A, green TFTs 46B, and red TFTs 46C are turned ON and OFF. When equal numbers of blue TFTs 46A, green TFTs 46B, and red TFTs 46C are turned ON, the display device generates a grey color. Due to the varying intensity associated with the TFTs 46, the subject display device 42 produces a different shade of grey for the first toggle pattern 54 and the second toggle pattern 58. The subject display device 42 generates a first grey state based on the first toggle pattern 54 and a second grey state based on the second toggle pattern 58.

Figure 6:
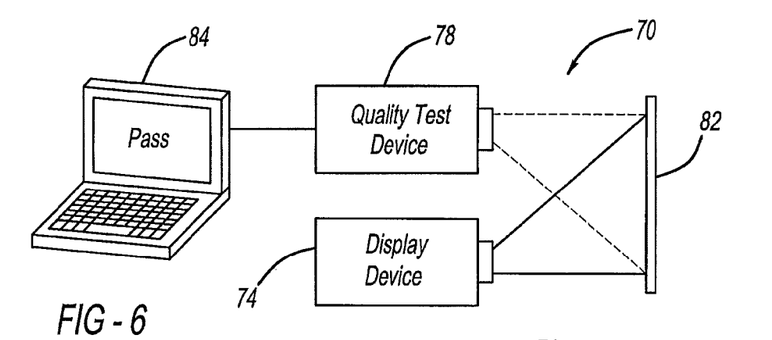
FIG. 6 illustrates a test system including a quality test device and a display device.

With reference to FIG. 6, an example of a test system 70 is shown. The test system 70 includes a display device 74 which is being tested and may be referred to as a test sample 74, and a quality test device 78. The display device 74 is shown as a HUD that projects an image onto a screen 82, such as a windshield. The quality test device 78 tests the display device 74 by analyzing the image displayed by the display device 74 as viewed by a user. For example, the quality test device 78 analyzes the image projected onto the screen 82 by the display device 74. The quality test device 78 determines whether the display device 74 is operating within a performance threshold, and may output the results of the test to a monitor of a computer 84. The display device 74 may be any one of the display devices 10.

Figure 7:
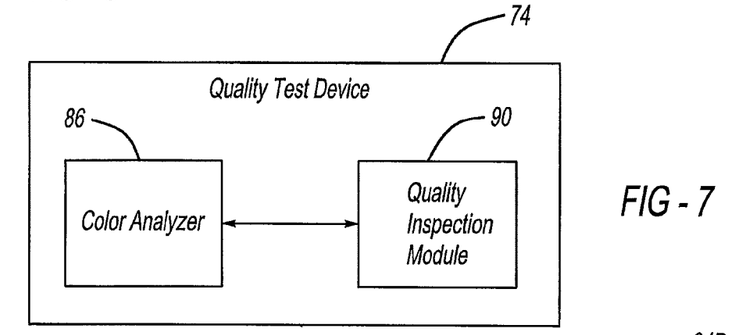
FIG. 7 is a functional block diagram of the quality test device.
Figure 8:
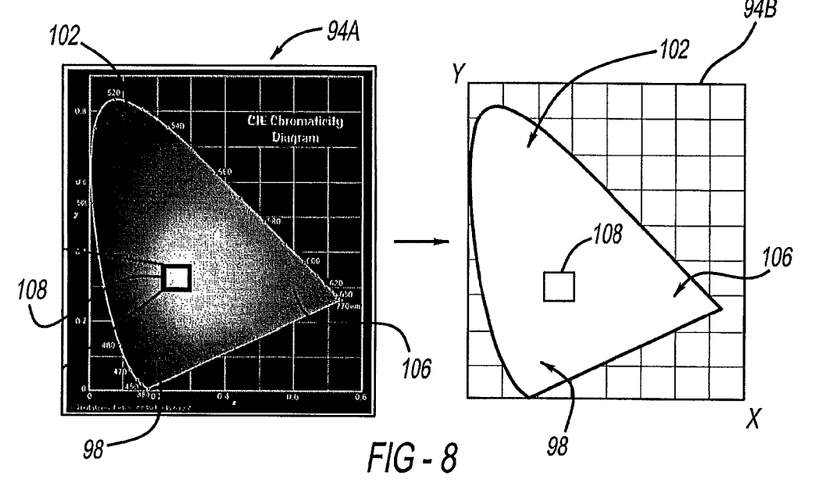
FIG. 8 illustrates a CIE chromaticity diagram and an associated chromaticity schematic.

With reference to FIG. 7, the quality test device 78 includes a color analyzer 86 and a quality inspection module 90. The color analyzer 86 measures the concentration of color of the image displayed by the display device 74. The color analyzer 86 may be a colorimeter that outputs a chromaticity of the image displayed by the display device 74. For example, FIG. 8 illustrates a picture of a CIE 1931 chromaticity diagram 94A and a schematic of a CIE 1931 chromaticity diagram 94B, which is a schematic of the diagram 94A. The picture of chromaticity diagram 94A and the schematic of the chromaticity diagram 94B may be collectively referred to as chromaticity diagram 94. The color analyzer 86 outputs one or more (x,y) values associated with one or more colors detected in the displayed image based on the chromaticity diagram.

The chromaticity diagram includes a blue region 98, a green region 102 and a red region 106. Blue, green, and red are primary colors and other colors provided within a color gamut are generated by a mixture of the three primary colors with adjustable brightness. For example, the chromaticity diagram 94 also includes a grey region 108 which includes various shades of grey.

Figure 9:
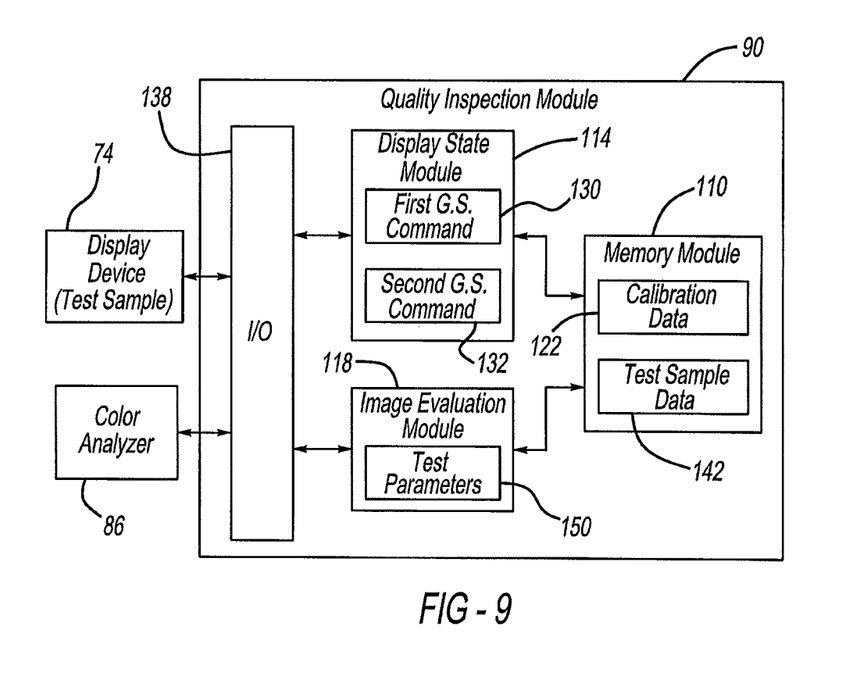
FIG. 9 is a functional block diagram of a quality inspection module of the quality test device.

With reference to FIG. 9, the quality inspection module 90 includes a memory module 110, a display state module 114, and an image evaluation module 118. The memory module 110 stores calibration data 122 based on images produced by a model display device and includes computer-readable medium. The model display device has each TFT connected to the PCB without any open and/or short connections.

Figure 10:
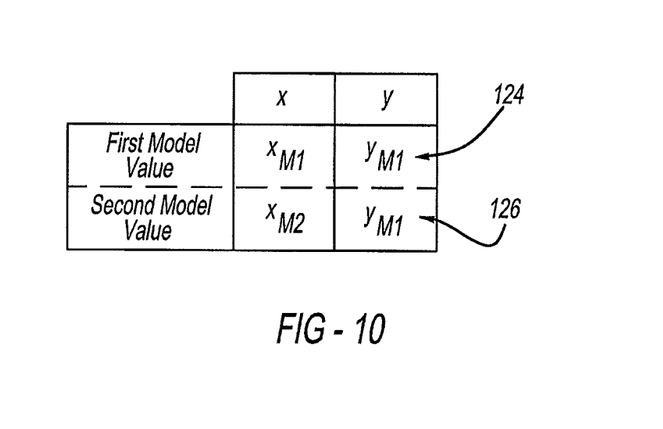
FIG. 10 is a table of model chromaticity values.

The calibration data 122 includes a chromaticity value of a first image generated by the model display device when the model display device is controlled based on the first toggle pattern 54 and a chromaticity value of a second image generated by the model display device when the model display device is controlled based on the second toggle pattern 58. For example, FIG. 10 shows chromaticity values 124 and 126 for the first image and second image, respectively, (i.e., ($x_{M1}$, $y_{M1}$) and ($x_{M2}$, $y_{M2}$)) which may be referred to as first model value and second model value. The memory module 110 further stores the chromaticity values of the first grey state and the second grey state generated by the test sample (TS), as described below.

The display state module 114 controls the display device 74 (i.e., the test sample (TS)) such that the display device 74 generates an image having a first grey state and an image having a second grey state. For example, the display state module 114 transmits a first grey state (G.S.) command 130 for toggling the TFTs of the display state module 114 based on the first toggle pattern 54 and a second grey state (G.S.) command 132 for toggling the TFTs of the display state module 114 based on the second toggle pattern 58. The display state module 114 may transmit the commands 130 and 132 via an input/output (I/O) interface 138.

The display state module 114 further receives the chromaticity values of the images displayed by the display device 74. That is, after controlling the display device 74 based on the first toggle pattern 54, the color analyzer 86 measures the chromaticity of the image generated by the display device 74 and transmits a chromaticity value (e.g., $(x_{TS1}, y_{TS1})$) to the display state module 114 via, for example, the I/O interface 138. Subsequently, the display state module 114 controls the display device 74 based on the second toggle pattern 58. The color analyzer 86 measures the chromaticity of the image generated by the display device 74 and transmits a chromaticity value (e.g., $(x_{TS2}, Y_{TS2})$). The display state module 114 stores the chromaticity values received in the memory module 110 as test sample data 142.

The image evaluation module 118 analyzes the performance of the display device 74 based on one or more test parameters 150. The test parameters 150 may include parameters 1-3 shown below, where $(x_1, y_1)$ is a chromaticity of an image based on the first toggle pattern 54 and $(x_2, y_2)$ is a chromaticity of an image based on the second toggle pattern 58.

$$\Delta x = |x_1 - x_2| \qquad \text{Parameter 1}$$

$$\Delta y = |y_1 - y_2| \qquad \text{Parameter 2}$$

$$\Delta = \Delta y - \Delta x \qquad \text{Parameter 3}$$

Figure 11:
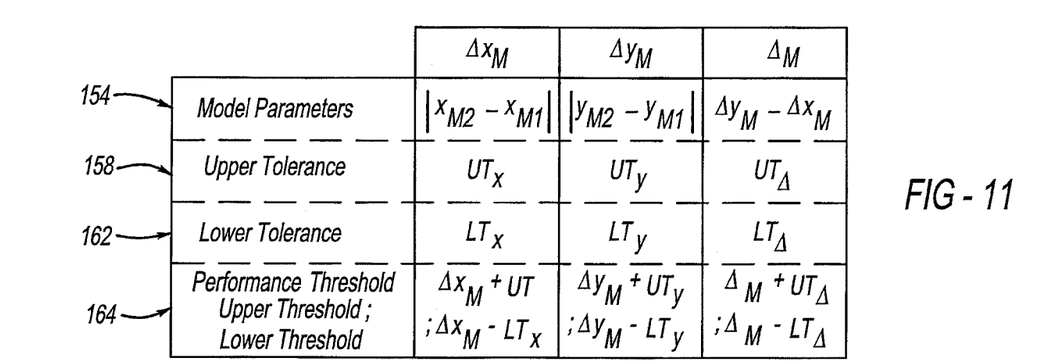
FIG. 11 illustrates model parameters, tolerance values, and performance thresholds.

The image evaluation module 118 calculates model parameters 154 based on the test parameters 150 and the calibration data 122 stored in the memory module 110. That is, as shown in FIG. 11, the image evaluation module 118 determines model parameters 154 (e.g., $\Delta x_M$, $\Delta y_M$, and $\Delta_M$) based on the chromaticity values of the model display device. The model parameters 154 may also be pre-stored in the memory module 110, as part of the calibration data 122.

The image evaluation module 118 then calculates performance data of the display device 74 based on the test parameters 150 and the test sample data 142. The performance data is provided as: $\Delta x_{TS} = |x_{TS1} - x_{TS2}|$; $\Delta y_{TS} = |y_{TS1} - y_{TS2}|$; and $\Delta_{TS} = \Delta y_{TS} = \Delta y_{TS} - \Delta x_{TS}$.

The image evaluation module 118 determines whether the performance data is within a performance threshold based on the model parameters. For example, FIG. 11 shows an upper tolerance (UT) 158 and a lower tolerance (LT) 162 for each of the model parameters 154. While the connection of the TFTs to the PCB 50 does affect performance of the display device, other external factors, such as other components within the display device, may also influence the performance of the display device. The upper tolerance 158 and lower tolerance 162 take into account such differences and provide a range within which the test sample 74 may perform within and be considered an acceptable device, or in other words, pass the quality inspection.

The image evaluation module 118 determines one or more performance thresholds 164 based on the model parameters and the upper and lower tolerances associated with each of the model parameters. The performance thresholds 164 include an upper threshold and a lower threshold for each of the parameters. The image evaluation module 118 compares the performance data with the performance thresholds, and determines if the performance data of the display device 74 falls within the upper threshold and the lower threshold. For example, the image evaluation module 118 determines if conditions 1-3, provided below, are met.

$$\Delta x_M - UT_x \leq \Delta x_{TS} \leq \Delta x_M + LT_x \qquad \text{Condition 1}$$

$$\Delta y_M - UT_y \leq \Delta y_{TS} \leq \Delta y_M + LT_y \qquad \text{Condition 2}$$

$$\Delta_M - UT_\Delta \leq \Delta_{TS} \leq \Delta_M + LT_\Delta \qquad \text{Condition 3}$$

The display device 74 may need to meet each of the conditions 1-3 in order to pass the quality test. That is, if one of the conditions is not met, the image evaluation module 118 determines that the test sample 74 does not pass the quality test, and may have a TFT that is not connected properly to the PCB 50. If all of the conditions are met, the image evaluation module 118 determines that the test sample 74 passes the quality test. Alternatively, the display device 74 may only need to satisfy a majority of the condition in order to pass the quality test.

When the display device 74 fails the quality test, the display device 74 may be put to the side and may not be installed in a vehicle until it is repaired. Alternatively, when the display device 74 passes the quality test, the display device 74 may be installed in the vehicle.

Based on the test parameters 150, the image evaluation module 118 determines the variation between the model display device and the test sample 74 while considering performance variations in the display devices. More particularly, a test sample which has its TFTs 46 properly connected to the PCB 50, may generate an image that has a chromaticity value that is different than the model device for the first grey state and the second grey state. The difference between the test sample and the model device may be the result of other external factors, such as reflective properties of a lens disposed in the display device, manufacturing variations, and/or other components outside of the connection between the TFTs 46 and the PCB 50. The image evaluation module 118 inspects the test sample 74 by determining the gap between the chromaticity values of the test sample and comparing the gap to the model parameters.

Figure 12:
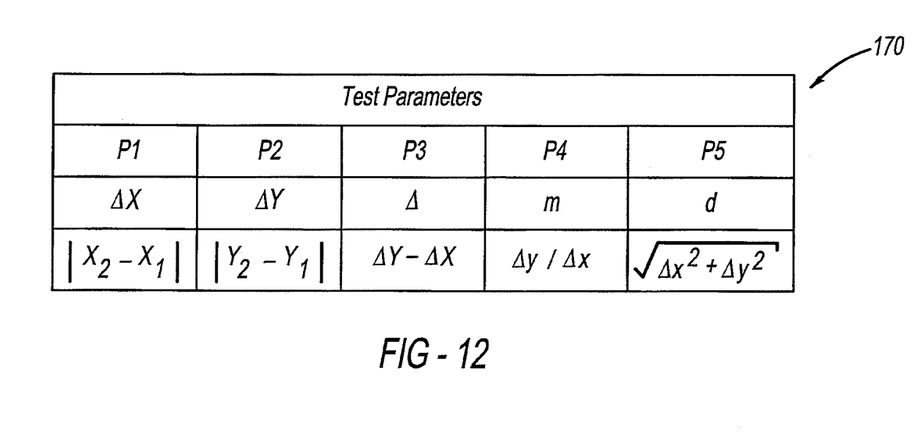
FIG. 12 illustrates test parameters for determining quality of a display module.

The test parameters 150 used by the image evaluation module 118, may include additional and/or different parameters. For example, with reference to FIG. 12, the image evaluation module 118 may include test parameters 170 which include parameters 1-3 (i.e., P1, P2, and P3) and also includes parameters 4-5 (i.e., P4 and P5). Parameter 4 is the slope (m) of the line formed by the chromaticity values, which are points $(x_1, y_1)$ and $(x_2, y_2)$ on the chromaticity diagram. Parameter 5 is the distance between the chromaticity values. The image evaluation module 118 may determine whether a test sample passes the quality test based on one or more of the parameters.

Figure 13:
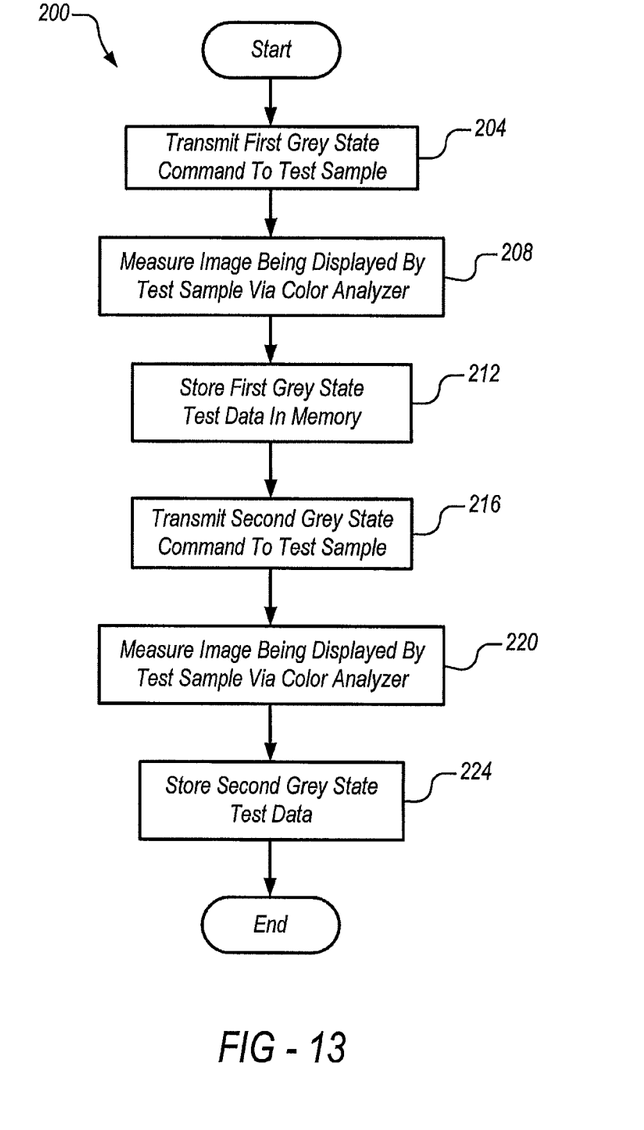
FIG. 13 is a flowchart of a test data collection method.

With reference to FIG. 13, a test data collection method 200 is shown. The test data collection method 200 acquires chromaticity values of images displayed by the test sample (e.g., display device 74) based on the first toggle pattern 54 and the second toggle pattern 58. At 204, the display state module 114 of the quality inspection module 90 controls the TFTs of the test sample based on the first toggle pattern 54 by transmitting a first grey state command to the test sample. At 208, the color analyzer 86 measures the chromaticity of the image displayed by the test sample. At 212, the display state module 114 module 90 stores the chromaticity value as first grey state test data in the memory module 110.

At 216, the display state module 114 controls the TFTs of the test sample based on the second toggle pattern 58 by transmitting a second grey state command to the test sample. At 220, the color analyzer 86 measures the chromaticity of the image displayed by the test sample. At 224, the display state module 114 stores the chromaticity value as second grey state test data in the memory module 110, and the method ends.

Figure 14:
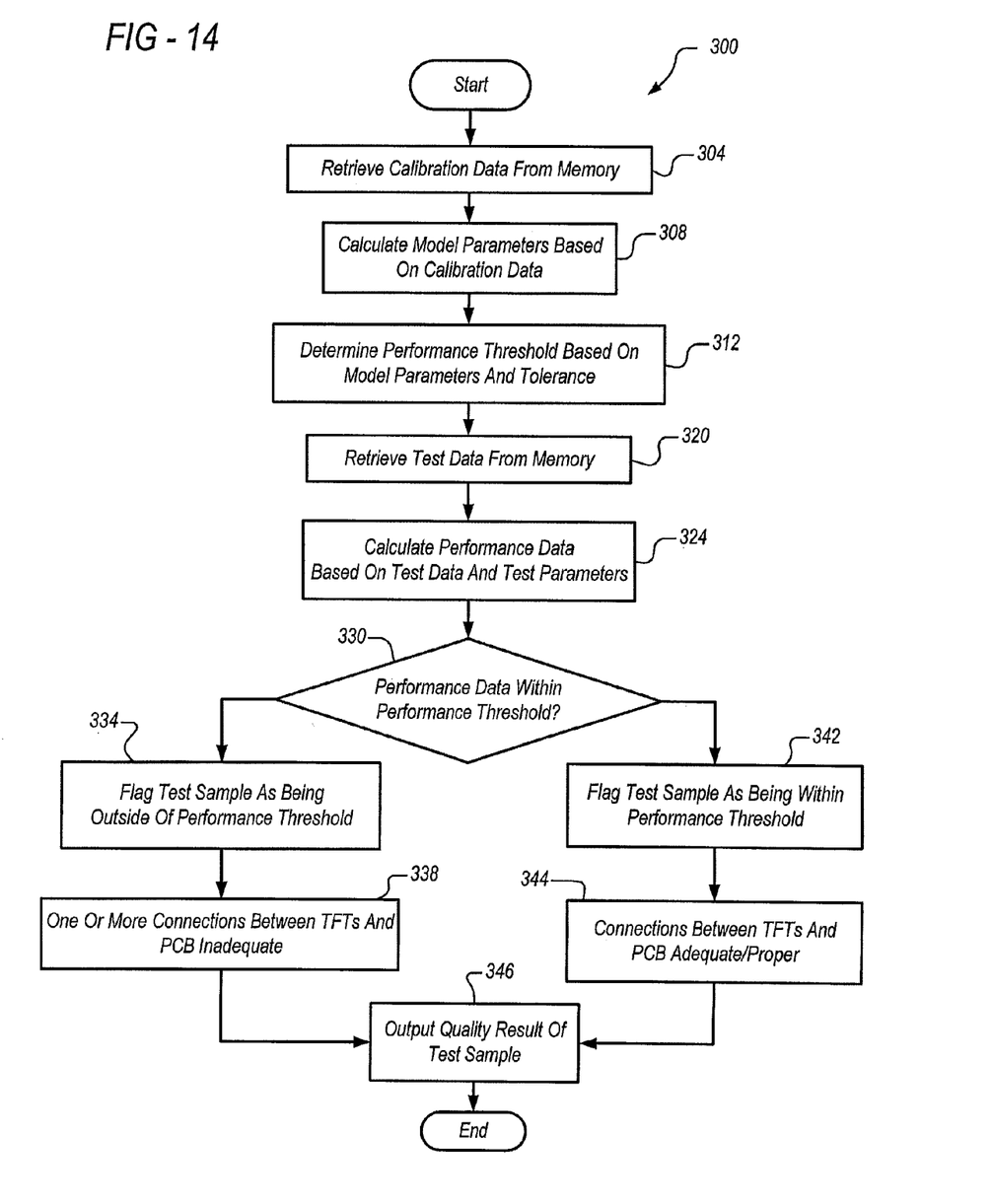
FIG. 14 is a flowchart of a quality inspection method.

With reference to FIG. 14, a quality inspection method 300 is shown. The quality inspection method 300 analyzes performance of the test sample based on the test data stored and the model parameters. At 304, the image evaluation module 118 acquires the calibration data from the memory module 110. The calibration data may include chromaticity values of a first grey state and a second grey state displayed by a model display device.

At 308, the image evaluation module 118 calculates model parameters based on the calibration data and test parameters. At 312, the image evaluation module 118 determines a performance threshold for each of the test parameters based on the models parameters and preset tolerances. The tolerances may be determined based on prior testing analysis and may be stored in the memory module 110 as calibration data. While the image evaluation module 118 calculates the model parameters and the performance thresholds, the model parameters and the performance thresholds may be pre-stored in the memory module 110 as part of the calibration data, thereby eliminating task 308 and 312.

At 320, the image evaluation module 118 retrieves the test data from the memory module 110 and at 324 calculates performance data of the test sample based on the test data and the test parameters. At 330, the image evaluation module 118 determines whether the performance data of the test sample is within the performance threshold. That is, the image evaluation module 118 determines whether a given performance data is within a respective performance threshold. If at least one of the performance data is outside of a respective performance threshold, the image evaluation module 118 flags the test sample as being outside of the performance threshold at 334 and determines that one or more TFTs may not be properly connected to the PCB 50 at 338. The image evaluation module 118 may then output a quality result of the test sample at 346 to, for example, a computer with a monitor. The quality result may indicate that the test sample did not pass the inspection and that one or more TFTs may not be properly connected to the PCB 50.

If all or a majority of the performance data is within the performance thresholds, the image evaluation module 118 flags the test sample as being within the performance threshold at 342. The image evaluation module 118, at 344, determines that the TFTs are properly connected to the PCB 50 and then outputs a quality result at 346. The quality result may indicate that the test sample passed the inspection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the term 'module' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Peli, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A quality test device for testing a display device having a plurality of thin film transistors TFTs, the display device configured to be disposed in a vehicle, the quality test device comprising:
   a color analyzer determining a color of an image displayed by the display device; and
   a quality inspection module controlling the display device to a predetermined display state and determining whether the TFTs are adequately disposed within the display device based on a performance threshold stored in a computer readable medium, wherein
   the color analyzer determines a color of the image displayed by the display device when the display device is controlled to the predetermined display state,
   the quality inspection module calculates performance data based on the color detected by the color analyzer and a test parameter associated with the performance threshold,
   the quality inspection module determines that the display device is defective when the performance data is outside of the performance threshold, and determines that the display device is normal when the performance data is within the performance threshold,
   the quality inspection module controls the display device to a first state and a second state, and the predetermined display state includes the first state and the second state,
   the color analyzer detects a first color of an image displayed by the display device when the display device is controlled to the first state and detects a second color of an image displayed by the display device when the display device is controlled to the second state,
   the quality inspection module calculates the performance data based on the first color, the second color, and the test parameter,
   the quality inspection module toggles the TFTs in an ON-OFF pattern to control the display device to the first state and toggles the TFTs in an OFF-ON pattern to control the display device to the second state, and wherein:
      the ON-OFF pattern comprises a first set of the plurality of TFT in an ON position and a second set of the plurality of TFT in an OFF position,
      the OFF-ON pattern comprises the first set of the plurality of TFT in an OFF position and the second set of the plurality of TFT in an ON position, and
      both the first and second sets include multiple TFTs.

2. The quality test device of claim 1 wherein
   when the display device is defective, the quality inspection module determines that one or more TFTs are not disposed correctly in the display device and
   when the display device is normal, the quality inspection module determines that the TFTs are disposed correctly in the display device.

3. The quality test device of claim 1 wherein the performance threshold is based on a model display device that has all of the TFTs correctly disposed in the display device.

4. The quality test device of claim 1 wherein the color determined by the color analyzer is a chromaticity value in a chromaticity diagram.

5. The quality test device of claim 1 wherein
   a plurality of the performance thresholds are stored in the computer readable medium,
   the quality inspection module calculates a given performance data for a given performance threshold based on the color determined by the color analyzer and the test parameter associated with the given performance threshold, and
   the quality inspection module determines that the display device is defective when one of the performance thresholds is not met.

6. A quality test device for testing a display device having a plurality of thin film transistors TFTs, the display device configured to be disposed in a vehicle, the quality test device comprising:
   a color analyzer determining a color value of an image displayed by the display device; and
   a quality inspection module controlling a display state of the display device to a first display state and a second display state and determining whether the TFTs are adequately disposed within the display device based on a performance threshold stored in a computer readable medium, wherein
   the color analyzer determines a first color value of an image displayed by the display device when the display device is controlled to the first display state and a second color value of an image displayed by the display device when the display device is controlled to the second display state,
   the quality inspection module calculates performance data based on the first color value, the second color value, and a test parameter associated with the performance threshold,
   the quality inspection module determines that the display device is defective when the performance data is outside of the performance threshold, and determines that the display device is normal when the performance data is within the performance threshold, the quality inspection module toggles the TFTs in an ON-OFF pattern to control the display device to the first display state and toggles the TFTs in an OFF-ON pattern to control the display device to the second display state, and wherein:
- the ON-OFF pattern comprises a first set of the plurality of TFT in an ON position and a second set of the plurality of TFT in an OFF position,
- the OFF-ON pattern comprises the first set of the plurality of TFT in an OFF position and the second set of the plurality of TFT in an ON position, and
- both the first and second sets include multiple TFTs.

7. The quality test device of claim 6 wherein
the performance threshold includes a model parameter, an upper tolerance level, and a lower tolerance level,
the model parameter is based on the test parameter and a first model color value of an image displayed by a model display device when the model display device is operated in the first display state and a second model color value of an image displayed by the model display device when the model display device is operated in the second display state, and
the model display device has all of the TFTs connected correctly to a printed circuit board of the display device.

8. The quality test device of claim 6 wherein the test parameter includes calculating a difference between a color value of an image displayed by a given display device controlled to the first display state and a color value of an image displayed by a given display device controlled to the second display state.

9. The quality test device of claim 6 wherein the color analyzer is a colorimeter.

10. The quality test device of claim 6, wherein the first color value and the second color value are chromaticity values in a chromaticity diagram.

11. A quality test method for determining a quality of a display device having a plurality of thin film transistors TFTs, the display device configured to be disposed in a vehicle, the method comprising:
- controlling, by a quality test device, the display device to a first display state;
- determining, by a color analyzer of the quality test device, a first color of an image displayed by the display device in the first display state;
- controlling, by the quality test device, the display device to a second display state;
- determining, by the color analyzer of the quality test device, a second color of an image displayed by the display device in the second display state;
- determining, by the quality test device, a performance data of the display device based on the first color, the second color, and a test parameter;
- comparing, by the quality test device, the performance data to a performance threshold associated with the test parameter, wherein the performance threshold is stored in a computer readable medium;
- flagging, by the quality test device, the display device as defective when the performance data is outside of the performance threshold and as normal when the performance data is within the performance threshold,
- toggling, by the quality test device, the TFTs in an ON-OFF pattern to control the display device to the first display state and toggling, by the quality test device, the TFTs in an OFF-ON pattern to control the display device to the second display state, and wherein:
  - the ON-OFF pattern comprises a first set of the plurality of TFT in an ON position and a second set of the plurality of TFT in an OFF position,
  - the OFF-ON pattern comprises the first set of the plurality of TFT in an OFF position and the second set of the plurality of TFT in an ON position, and
  - both the first and second sets include multiple TFTs.

12. The method of claim 11 wherein the first color and the second color are chromaticity values provided in a chromaticity diagram.

13. The method of claim 11 further comprising:
- determining that one or more TFTs are not disposed correctly in the display device when the display device is defective; and
- determining that the TFTs are sufficiently disposed in the display device when the display device is normal.

14. The method of claim 11 wherein the display device that is flagged as defective is not disposed in the vehicle and the display device that is flagged as normal is disposed in the vehicle.

15. The method of claim 11 wherein the performance threshold is based on a model display device that has all of the TFTs correctly disposed in the display device.

* * * * *